(12) United States Patent
Cropper et al.

(10) Patent No.: US 10,078,428 B2
(45) Date of Patent: *Sep. 18, 2018

(54) PLACEMENT OF VIRTUAL MACHINES ON PHYSICAL HOSTS BASED ON COLLOCATION RULES

(71) Applicant: International Business Machines Corporation, Armonk, NY (US)

(72) Inventors: Joseph W. Cropper, Rochester, MN (US); Jennifer D. Mulsow, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,974

(22) Filed: Jun. 16, 2015

(65) Prior Publication Data

US 2016/0342436 A1    Nov. 24, 2016

Related U.S. Application Data

(63) Continuation of application No. 14/718,308, filed on May 21, 2015, now Pat. No. 9,886,176.

(51) Int. Cl.
  *G06F 3/0484* (2013.01)
  *G06F 9/455* (2018.01)
  *G06F 9/50* (2006.01)

(52) U.S. Cl.
  CPC ........ *G06F 3/0484* (2013.01); *G06F 9/45558* (2013.01); *G06F 9/5077* (2013.01); *G06F 2009/4557* (2013.01); *G06F 2009/45562* (2013.01); *G06F 2009/45575* (2013.01)

(58) Field of Classification Search
  CPC .......................... G06F 9/45558; G06F 9/45533
  See application file for complete search history.

(56) References Cited

U.S. PATENT DOCUMENTS

| | | | |
|---|---|---|---|
| 9,052,935 B1 * | 6/2015 | Rajaa | G06F 9/45558 |
| 2010/0250744 A1 * | 9/2010 | Hadad | G06F 9/4856 |
| | | | 709/226 |
| 2011/0246992 A1 | 10/2011 | Kern | |
| 2012/0324071 A1 * | 12/2012 | Gulati | G06F 9/5033 |
| | | | 709/223 |

(Continued)

OTHER PUBLICATIONS oVirt, Features/VM-Affinity, printed from www.ovirt.org/Features/VM-Affinity on Mar. 13, 2015.

(Continued)

*Primary Examiner* — Wei Zhen
*Assistant Examiner* — Brahim Bourzik
(74) *Attorney, Agent, or Firm* — Martin & Associates, LLC; Bret J. Petersen

(57) ABSTRACT

Placement of virtual machines on physical hosts is based on collocation rules with situational enforcement policies set by a system administrator to increase flexibility in rule enforcement and to more efficiently utilize system resources. A scheduler mechanism allows a system administrator to select different collocation rules and situational enforcement policies for a group of virtual machines. The scheduler mechanism utilizes the collocation rules and the situational enforcement policies to place the virtual machines.

7 Claims, 6 Drawing Sheets

432, 442 Collocation Rules    514

| | | | Situations For Situational Enforcement Policies | | | | |
|---|---|---|---|---|---|---|---|
| | VM Group 510 | Rule 512 | Live Mig. 516 | Cold Mig. 518 | Rebuild 520 | Evacuation 522 | Other 524 |
| 526 | GroupA | Anti-Affinity | Hard | Soft | Soft | Soft | Hard |
| 528 | GroupB | Anti-Affinity | Soft | Hard | Hard | Hard | Soft |
| 530 | GroupC | Affinity | Soft | Soft | Hard | Soft | Soft |

515

(56) References Cited

U.S. PATENT DOCUMENTS

| | | | | |
|---|---|---|---|---|
| 2013/0097464 A1* | 4/2013 | Ahmad | ............... | G06F 9/45558 |
| | | | | 714/47.1 |
| 2014/0196037 A1* | 7/2014 | Gopalan | ............... | G06F 9/4856 |
| | | | | 718/1 |
| 2014/0280952 A1 | 9/2014 | Shear et al. | | |
| 2015/0006734 A1* | 1/2015 | Parikh | ..................... | H04L 47/70 |
| | | | | 709/226 |
| 2015/0341223 A1* | 11/2015 | Shen | ....................... | H04L 41/12 |
| | | | | 709/223 |

OTHER PUBLICATIONS

Oracle, "3.4 Server Pool Item", printed from http://docs.oracle.com/cd/E50245_01/E50250/html/vmusg-svrpool-nav-item.html#vmusg-svrpool-aa-perspective on Mar. 13, 2015.

VMware, "Using DRS Affinity Rules", printed from https://pubs.vmware.com/vsphere-55/index.jsp?topic=%2Fcom.vmware.vsphere.resmgmt.doc%2FGUID-FF28F29C-8B67-4EFF-A2EF-63B3537E6934.html on Mar. 13, 2015.

Cropper et al., "Placement of Virtual Machines on Physical Hosts Based on Collocation Rules" U.S. Appl. No. 14/718,308, filed May 21, 2015.

Cropper et al., "Placement of Virtual Machines on Physical Hosts Based on Collocation Rules" U.S. Appl. No. 15/814,351, filed Nov. 15, 2017.

Appendix P—List of IBM Patents or Patent Applications Treated As Related, dated Dec. 1, 2017.

* cited by examiner

| 432, 442 Collocation Rules | | 514 | | | | |
|---|---|---|---|---|---|---|
| | | Situations For Situational Enforcement Policies | | | | |
| VM Group 510 | Rule 512 | Live Mig. 516 | Cold Mig. 518 | Rebuild 520 | Evacuation 522 | Other 524 |
| GroupA | Anti-Affinity | Hard | Soft | Soft | Soft | Hard |
| GroupB | Anti-Affinity | Soft | Hard | Hard | Hard | Soft |
| GroupC | Affinity | Soft | Soft | Hard | Soft | Soft |

526, 528, 530

515

US 10,078,428 B2

PLACEMENT OF VIRTUAL MACHINES ON PHYSICAL HOSTS BASED ON COLLOCATION RULES

BACKGROUND

1. Technical Field

This invention generally relates to virtual machines in a computing environment, and more specifically relates to placement of virtual machines on physical hosts based on collocation rules with situational policies for hard and soft enforcement of the collocation rules.

2. Background Art

Cloud computing is a common expression for distributed computing over a network and can also be used with reference to network-based services such as Infrastructure as a Service (IaaS). IaaS is a cloud based service that provides physical processing resources to run virtual machines (VMs) as a guest for different customers. The virtual machine may host a user application or a server.

A computing environment, such as a cloud computing environment, may have a large number of physical machines that can each host one or more virtual machines. Prior art cloud management tools allow a system administrator to select collocation rules that determine the placement of virtual machines on a physical host in relation to other virtual machines. Collocation rules include affinity rules and anti-affinity rules. Affinity rules specify a relationship how a virtual machine is placed with related virtual machines in a group of virtual machines on a host or set of hosts. Similarly, anti-affinity rules specify how a virtual machine is not to be placed with other virtual machines on the same host or cluster of hosts. In some prior art systems the system administrator is also able to select how all the collocation rules are enforced. Strictly enforced rules are called hard rules, and rules that are not strictly enforced are called soft rules.

BRIEF SUMMARY

An apparatus and method place virtual machines on physical hosts based on collocation rules with situational enforcement policies set by a system administrator to more efficiently utilize system resources. A scheduler mechanism allows a system administrator to select different collocation rules and situational enforcement policies for a group of virtual machines. The scheduler mechanism utilizes the collocation rules and the situational enforcement policies to place the virtual machines for one or more host groups.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
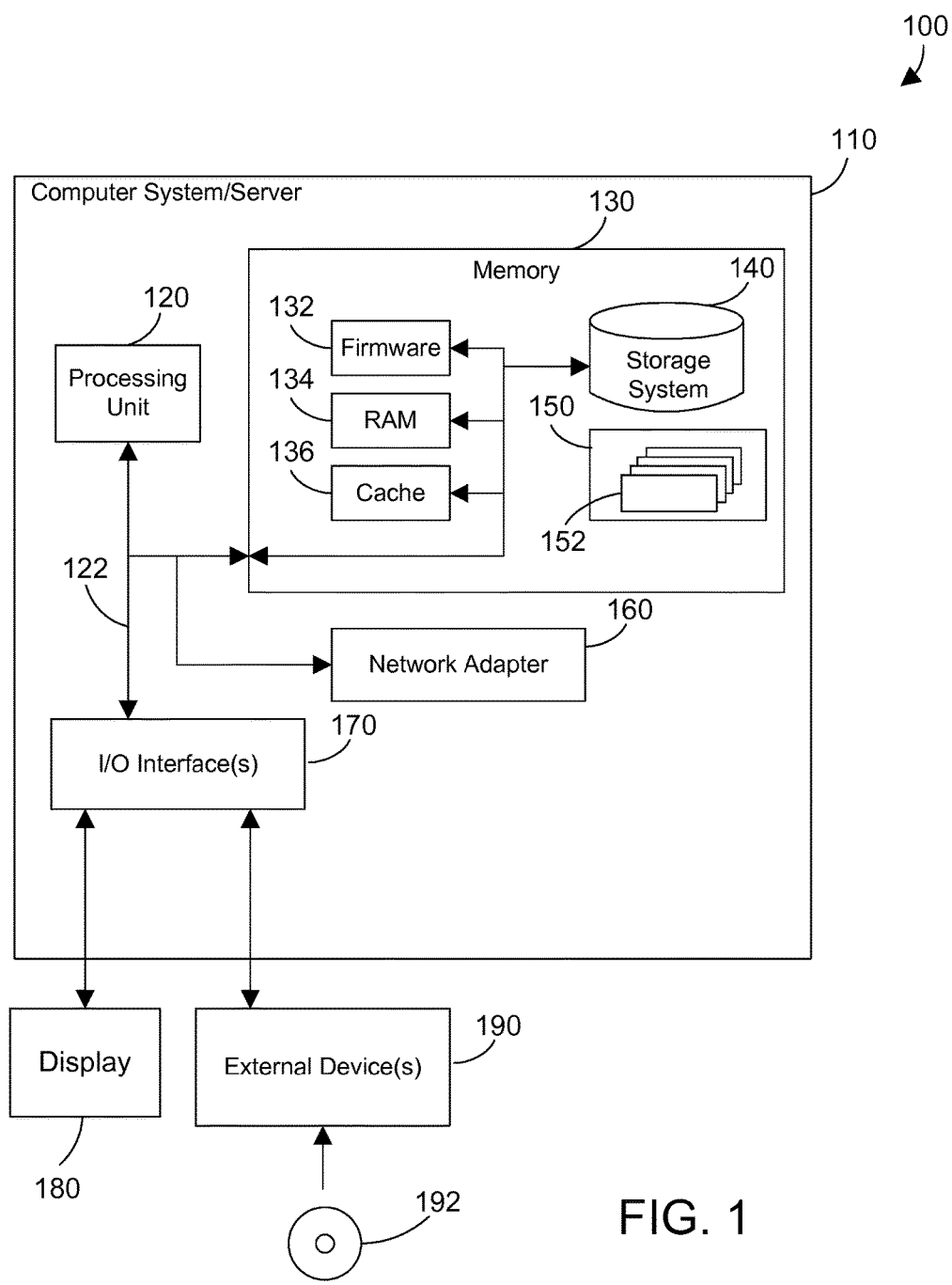
FIG. 1 is a block diagram of a cloud computing node.

The claims and disclosure herein provide an apparatus and method for placing virtual machines on physical hosts based on collocation rules with situational enforcement policies set by a system administrator to increase flexibility in rule enforcement and more efficiently utilize system resources. A scheduler mechanism allows a system administrator to select different collocation rules and situational enforcement policies for a group of virtual machines. The scheduler mechanism utilizes the collocation rules and the situational enforcement policies to place the virtual machines.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
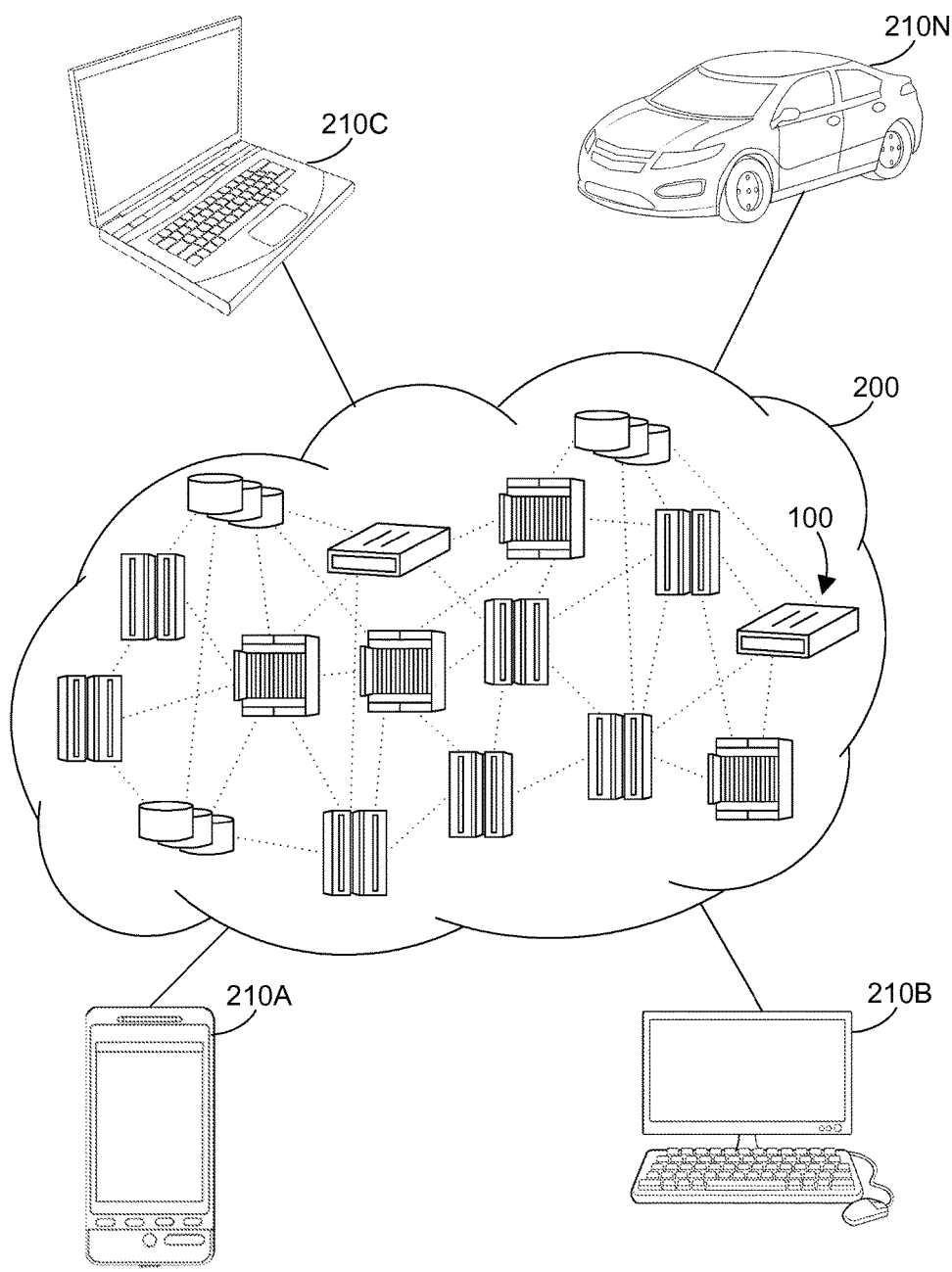
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
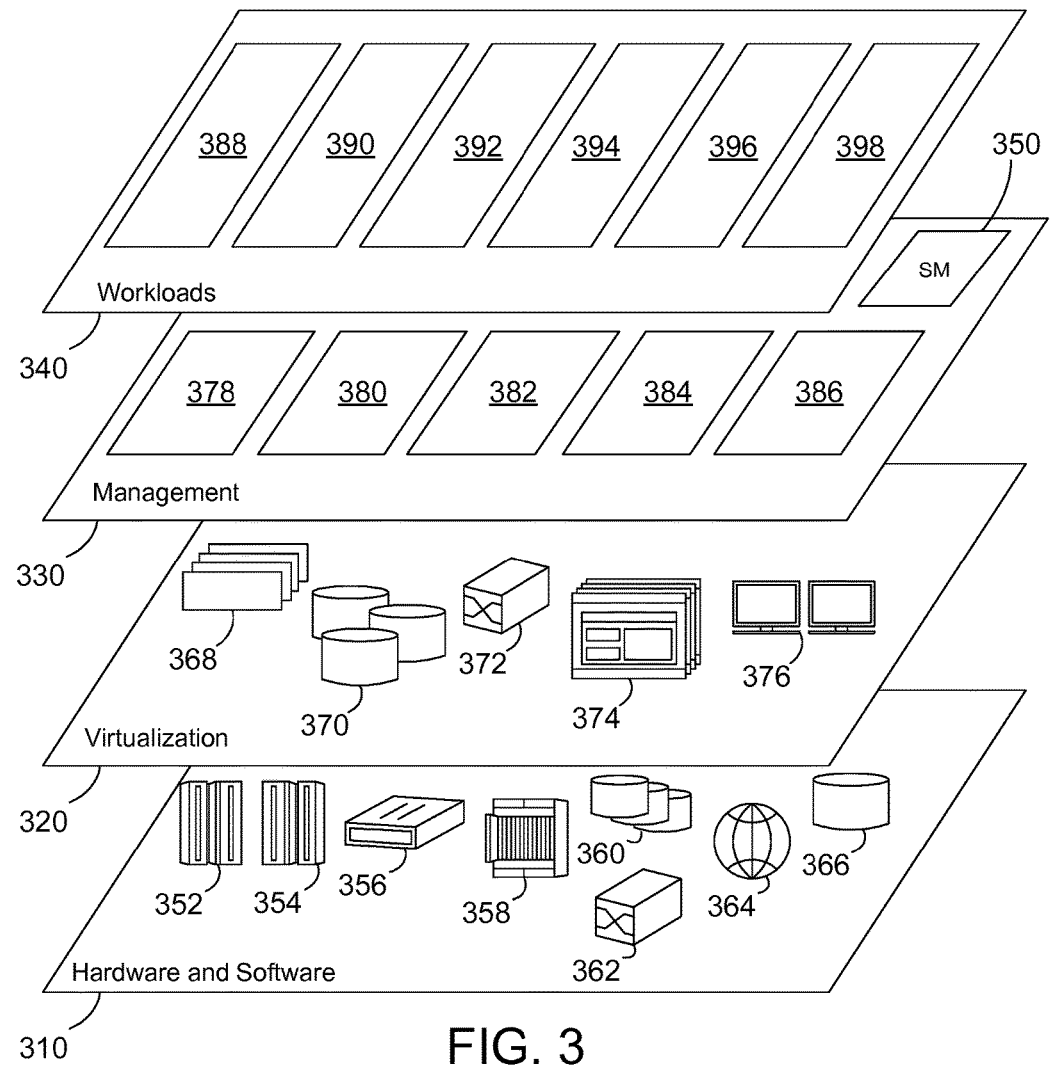
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a scheduler mechanism (SM) 350 as described herein. While the SM 350 is shown in FIG. 3 to reside in the management layer 330, the SM 350 actually may span other levels shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figures 4, 5:
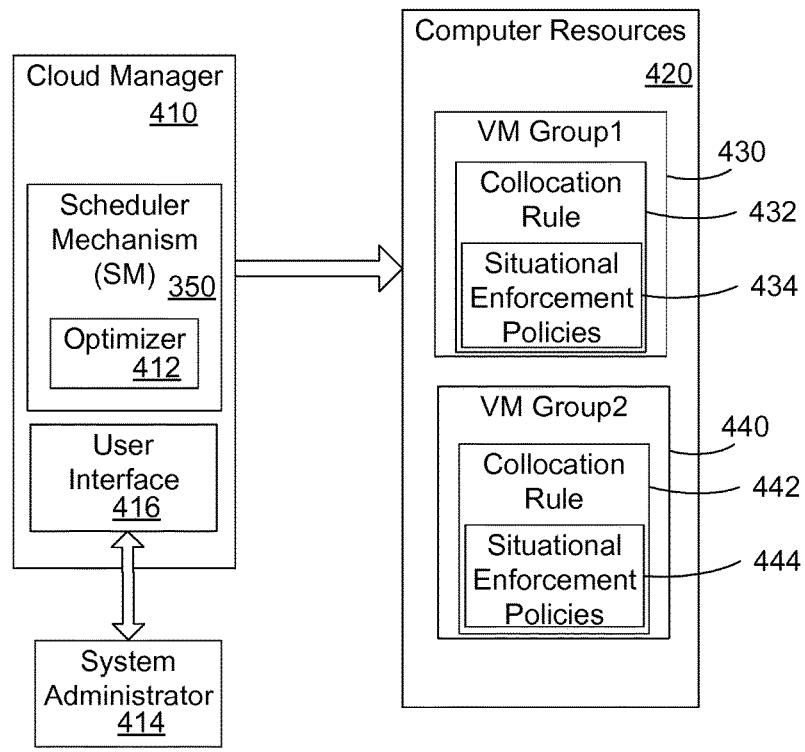
FIG. 4 is a block diagram that illustrates a scheduler mechanism as described herein that places virtual machines on physical resources based on collocation rules with situational enforcement policies set by a system administrator.
FIG. 5 is a table that illustrates some examples of collocation rules and situational enforcement policies.

Referring now to FIG. 4, a block diagram illustrates a scheduler mechanism 350 (shown in FIG. 3 and introduced above) that performs placement of virtual machines (VMs) on physical resources based on collocation rules and situational enforcement policies. In the illustrated example, the scheduler mechanism 350 is part of a cloud manager 410. The cloud manager 410 may be similar to cloud managers known in the prior art but includes the additional features of the scheduler mechanism 350 as described herein. The cloud manager 410 allows a human user or system administrator 414 to set up and manage computer resources 420 through a user interface 416. The cloud manager 410 implements the cloud management functions 330 described above with reference to FIG. 3. The scheduler mechanism 350 includes an optimizer 412. The optimizer 412 works in conjunction with the scheduler mechanism 350. The optimizer 412 may operate similarly to prior art optimizers except as described herein. The optimizer 412 monitors VM and host performance to determine when migration needs to occur and supports the scheduler mechanism 350 in migrating VMs to other hosts according to policies set by a system administrator. The operation of the scheduler mechanism 350 is described further below.

Referring again to FIG. 4, the cloud manager 410 allows the system administrator 414 to set up and manage hardware computer resources 420. Computer resources 420 represent computer resources such as physical host computer systems in a cloud computing environment. In the illustrated example, the computer resources 420 host two groups of virtual machines, VM Group1 430 and VM Group2 440. A VM group is a logical grouping of one or more virtual machines managed by the cloud manager 410. The computer resources 420 may include a large number of physical computer hosts (not shown) arranged into one or more host groups. The virtual machine groups may be hosted on one or more physical hosts in the host groups. The physical computer hosts in the computer resources 420 may be located remotely from the cloud manager 410. A host is a physical computer accessible over a network to the cloud manager 410. A host has a hypervisor (software) that allows the host to run one or more virtual machines as known in the prior art.

As shown in FIG. 4, VM Group1 430 has a collocation rule 432 and situational enforcement policies 434. Similarly, VM Group2 440 has a collocation rule 442 with situation enforcement polices 444. In FIG. 4, the collocation rules 432,442 and situational enforcement policies 434, 444 are shown within their respective VM group for illustration purposes. The collocation rules 432,442 and situational enforcement policies 434, 444 are logically associated with the respective VM group as shown. However, the collocation rules 432, 442 and situational enforcement policies 434, 444 may physically reside in any suitable location such as in memory, a file or a table assessable to the scheduler mechanism 350.

As discussed above, the scheduler mechanism 350 provides placement of virtual machines on physical computer resources based on collocation rules and situational enforcement policies set by a system administrator. Examples of collocation rules are affinity and anti-affinity. An affinity rule specifies a relationship where a virtual machine is placed with related virtual machines in a group on one or more physical hosts. Similarly, an anti-affinity rule specifies that a virtual machine is not to be placed with other virtual machines belonging to the same group on the same physical host. A situational enforcement policy as used herein means a situation or set of circumstances where a policy dictates whether to invoke hard or soft enforcement of the collocation rule. Hard enforcement of a rule means that the collocation rule (affinity or anti-affinity) is strictly enforced despite the circumstances or situation. Conversely, soft enforcement of a rule means the collocation rule may not necessarily be enforced, and thus placement of the virtual machine may be done at the discretion of the scheduler mechanism regardless of the affinity or anti-affinity rule corresponding to the virtual machine being placed.

FIG. 5 illustrates a table with some examples of collocation rules 432, 442 for VM groups as introduced with reference to FIG. 4. In the simplified example shown in FIG. 5, there are three virtual machine groups 510, GroupA 526, GroupB 527 and GroupC 530. Each of these virtual machine groups 510 represent a container or definition that correlate virtual machines into a group having the given group name. For each VM group 510 there is a collocation rule 512. In this example, the collocation rule 512 associated with each VM group 510 is either affinity or anti-affinity as shown in the table. Similarly, for each VM group 510 there are one or more situations 514 for the situational enforcement policies. A few of the more common situations that could have an enforcement policy are given here as examples of enforcement policies that could be utilized by the scheduler mechanism 350 as described herein to place virtual machines. In the illustrated example shown in FIG. 5, situations for the situational enforcement policies include live migration 516, cold migration 518, rebuild 520, evacuation 522 and other 524. The other situation 524 represents other situations which could be provided with an enforcement policy but not explicitly described herein. Each of the situations 516, 518, 520, 522 and 524 has a corresponding situational enforcement policy 515 for each VM group 510. In the illustrated example, the situational enforcement policies indicate hard enforcement or soft enforcement of the collocation rule for the corresponding VM group 510 as shown in the table in FIG. 5.

As described above with reference to FIG. 5, the example situational enforcement policies 514 described herein include live migration 516, cold migration 518, rebuild 520, evacuation 522 and other 524. A live migration is a situation where an active virtual machine is moved to another host without being halted. Conversely, a cold migration is a situation where an inactive virtual machine is migrated to a different host. A rebuild is a situation where a 'host recovery' operation is performed to rebuild VMs from an unoperable or unhealthy host to a healthy host. An evacuation is a situation where a user requests evacuation of a host like in the case of placing the host in a maintenance mode. In these situations, the migrations are typically un-targeted. Un-targeted means the user has not specified the target host and the VM scheduler 350 is to determine the target host.

As discussed above, the scheduler mechanism 350 allows a system administrator to select collocation rules and situational enforcement policies for a group of virtual machines. The scheduler mechanism may store this information in a table as shown in FIG. 5. The table may be stored in memory, a computer file or in a database available to the scheduler mechanism. The scheduler mechanism thus allows a system administrator to set a unique enforcement policy for a group of virtual machines for one or more various situations that may occur in the system. The need for situational enforcement for one VM group may differ from the needs of another VM group for the same situation. For example, for the situation of a live migration, the system administrator may select a hard enforcement policy for GroupA 526 but soft enforcement policies for GroupB 528 as shown in FIG. 5. GroupA 526 may require hard enforcement during live migration because it is a production environment with strict customer requirements to not place VM workloads on the same physical host with other customers or competitors. Conversely, GroupB may be a test environment that does not have strict anti-affinity rules and operations may be successful despite the non-compliance with the anti-affinity rule.

Figure 6:
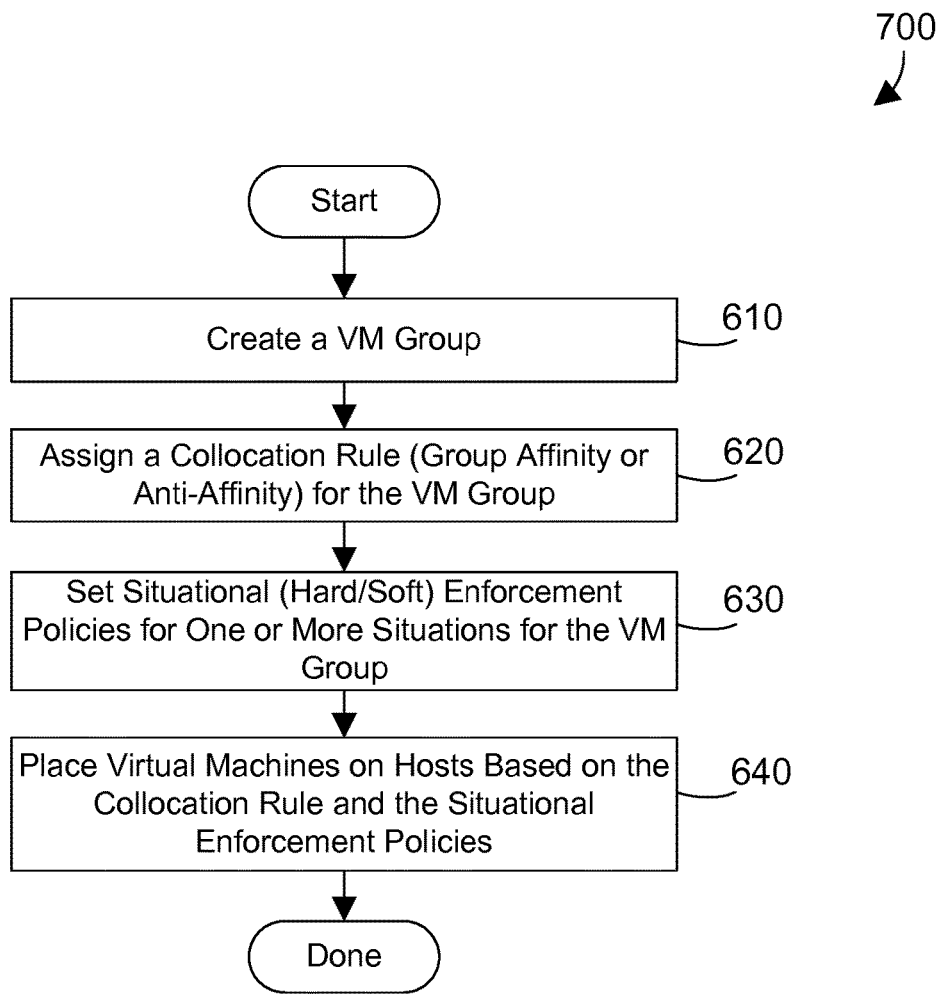
FIG. 6 is a flow diagram of a method for placement of virtual machines on physical resources based on collocation rules with situational enforcement policies set by a system administrator as described herein.

FIG. 6 illustrates a flow diagram of a method 600 for placing virtual machines on physical resources based on collocation rules with situational enforcement policies set by a system administrator. The method 600 is presented as a series of steps performed by a computer software program such as the scheduler mechanism 350 described above. First, create at least one virtual machine (VM) group (step 610), which can be done by a system administrator using a graphical user interface. Assign a collocation rule (affinity or anti-affinity) to the VM group (step 620). Set situational enforcement policies for one or more situations for the VM group (step 630). Steps 720 and 730 can also be accomplished by allowing a system administrator to select the policies using a graphical user interface. Place virtual machines on hosts based on the collocation rules and the situational enforcement policies (step 640). The method is then done.

Figure 7:
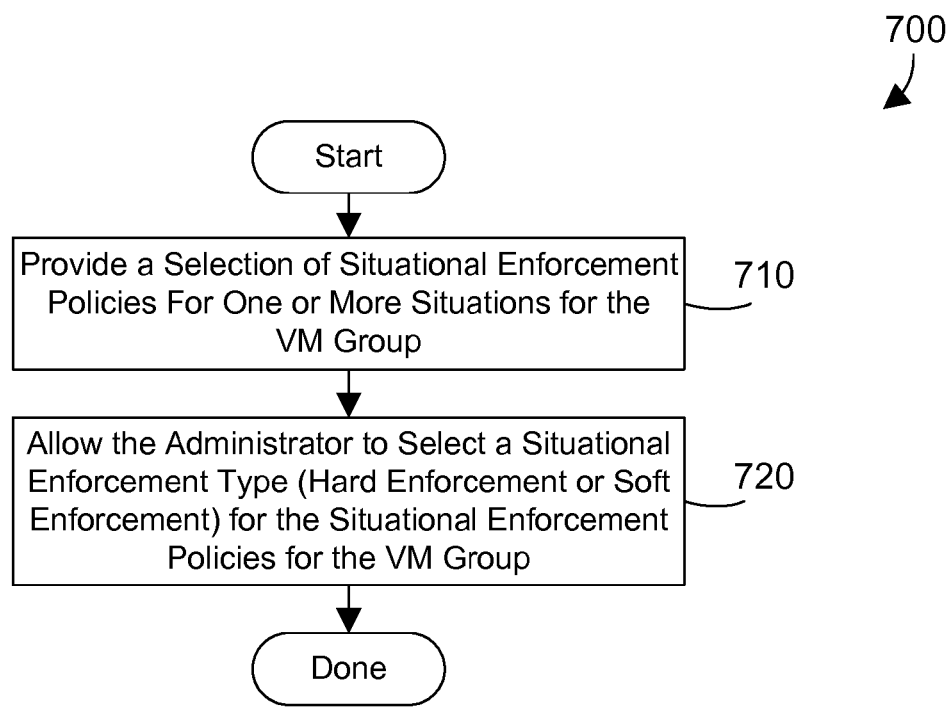
FIG. 7 is a flow diagram of an example method for step 630 in FIG. 6.

Referring now to FIG. 7, a flow diagram shows method 700 that is an exemplary method for performing step 630 in method 600 shown in FIG. 6. Step 620 of method 600 could also be accomplished with similar steps as shown here for step 630. The method 700 is presented as a series of steps performed by a computer software program such as the scheduler mechanism 350 described above. First, provide an administrator with a selection of situational enforcement policies for one or more situations for the VM group (step 710), then allow the administrator to select a situational enforcement type (hard enforcement or soft enforcement) for the situational enforcement policies for the VM group (step 720). The method is done.

The claims and disclosure herein provide an apparatus and method for placement of virtual machines on physical resources based on based on collocation rules with situational enforcement policies set by a system administrator to more efficiently utilize system resources and serve the needs of different workloads.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method for placing virtual machines on physical host computer systems, the method comprising:
   creating a plurality of virtual machine groups comprising a plurality of virtual machines;
   assigning a collocation rule for each virtual machine group wherein the collocation rule is chosen from one of the following: affinity rule, and anti-affinity rule;
   setting a plurality of situational enforcement policies for each virtual machine group wherein the plurality of situational enforcement policies include a situational enforcement policy for each of a plurality of situations, wherein the plurality of situation enforcement policies indicate how to enforce the collocation rule for the respective group for placement of the plurality of virtual machines on a physical host computer system for the plurality of situations;
   placing the plurality of virtual machines on the physical host computer system based on the collocation rule and the plurality of situational enforcement policies;
   wherein the plurality of situations for the situational enforcement policies comprise the following: live migration, and cold migration; and
   wherein a system administrator is allowed to select a situational enforcement policy type for each situational enforcement policy chosen from: hard policy enforcement that indicates to strictly enforce the collocation rule, and soft policy enforcement that indicates strict enforcement of the collocation rule is not required.

2. The method of claim 1 wherein the collocation rule is assigned and the plurality of situational enforcement policies are set using a graphical user interface.

3. The method of claim 1 wherein the steps are carried out in a management layer of a cloud computing environment.

4. The method of claim 1 wherein the physical host computer systems are part of a cloud computing environment.

5. The method of claim 1 further comprising providing a system administrator with a plurality of situational enforcement policies for the virtual machine group for one or more of the plurality of situations.

6. The method of claim 5 wherein plurality of situations for the plurality of situational enforcement policies comprise:
   rebuild, and evacuation.

7. A computer-implemented method for placing virtual machines on physical host computer systems, the method comprising:
   creating a plurality of virtual machine groups comprising a plurality of virtual machines;
   assigning a collocation rule for each virtual machine group, wherein the collocation rule is chosen from one of the following: affinity rule, and anti-affinity rule;
   setting a plurality of situational enforcement policies for each virtual machine group that indicate how to place the plurality of virtual machines on a physical host computer system for a plurality of situations by providing a system administrator with a plurality of situational enforcement policies, wherein the plurality of situational enforcement policies include a situational enforcement policy for each of the plurality of situations that indicate how to enforce the collocation rule for the respective group for the plurality of situations, and by allowing the system administrator to select situational enforcement policies for the plurality of situations selected from hard policy enforcement and soft policy enforcement, wherein hard policy enforcement indicates to strictly enforce the collocation rule, and soft policy enforcement indicates strict enforcement of the collocation rule is not required;
   placing the plurality of virtual machines on the physical host computer system based on the collocation rule and the plurality of situational enforcement policies for the respective group; and
   wherein the plurality of situations for the plurality of situational enforcement policies are chosen from one of the following: live migration, cold migration, rebuild, and evacuation.

* * * * *